（12）United States Patent
Hase et al.

(10) Patent No.: US 11,118,476 B2
(45) Date of Patent: Sep. 14, 2021

(54) TRANSITION DUCT, TURBINE, AND GAS TURBINE ENGINE (71) Applicant: MITSUBISHI HEAVY INDUSTRIES AERO ENGINES, LTD., Aichi (JP)

(72) Inventors: Takaaki Hase, Aichi (JP); Daigo Fujimura, Tokyo (JP); Tadayuki Hanada, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 327 days.

(21) Appl. No.: 16/311,828

(22) PCT Filed: Dec. 8, 2017

(86) PCT No.: PCT/JP2017/044236
§ 371 (c)(1),
(2) Date: Dec. 20, 2018

(87) PCT Pub. No.: WO2018/110460
PCT Pub. Date: Jun. 21, 2018

(65) Prior Publication Data
US 2019/0226359 A1 Jul. 25, 2019

(30) Foreign Application Priority Data
Dec. 15, 2016 (JP) .............................. JP2016-243708

(51) Int. Cl.
*F01D 25/24* (2006.01)
*F01D 9/02* (2006.01)
(Continued)

(52) U.S. Cl.
CPC ............. *F01D 25/24* (2013.01); *F01D 9/023* (2013.01); *F01D 9/04* (2013.01); *F02C 3/073* (2013.01);
(Continued)

(58) Field of Classification Search
CPC . F01D 25/24; F01D 9/023; F01D 9/04; F02C 3/073; F02C 7/00; F05D 2240/12
See application file for complete search history.

(56) References Cited

U.S. PATENT DOCUMENTS 7,517,192 B2 4/2009 Hoeger
9,222,437 B2 * 12/2015 Machnaim .............. B23P 11/00
(Continued)

FOREIGN PATENT DOCUMENTS

EP 1643083 A2 4/2006
EP 2159398 A2 3/2010
EP 2660424 A1 11/2013

OTHER PUBLICATIONS

Extended European Search Report for European Application No. 17880624.6 dated May 20, 2020; 6pp.

*Primary Examiner* — Craig Kim
(74) *Attorney, Agent, or Firm* — Hauptman Ham, LLP (57) ABSTRACT

Provided is a transition duct that forms an annular gas flow channel through which a main flow gas flows from a high-pressure turbine to a low-pressure turbine, wherein the gas flow channel has an inner peripheral flow channel surface and an outer peripheral flow channel surface, the inner peripheral flow channel surface and the outer peripheral flow channel surface extend radially outward while angles of inclination relative to an axial direction of a rotating shaft change from the high-pressure turbine (first turbine) toward the low-pressure turbine (second turbine), and an inner peripheral maximum inclined part is provided in a range A2 that extends in the axial direction from a position of alignment with an outer peripheral maximum inclined part to a position advanced toward the low-pressure turbine by a length no more than 20% of the duct length.

8 Claims, 6 Drawing Sheets

(51) Int. Cl.
*F02C 7/00* (2006.01)
*F01D 9/04* (2006.01)
*F02C 3/073* (2006.01)

(52) U.S. Cl.
CPC ............ *F02C 7/00* (2013.01); *F05D 2240/12* (2013.01); *F05D 2250/311* (2013.01); *F05D 2250/314* (2013.01)

(56) References Cited

U.S. PATENT DOCUMENTS

| | | | |
|---|---|---|---|
| 2006/0069533 A1* | 3/2006 | Florea | F02C 9/18 703/1 |
| 2007/0017225 A1* | 1/2007 | Bancalari | F01D 9/023 60/752 |
| 2011/0225979 A1 | 9/2011 | Hoeger et al. | |
| 2014/0086739 A1 | 3/2014 | Machnaim et al. | |

* cited by examiner

TRANSITION DUCT, TURBINE, AND GAS TURBINE ENGINE

RELATED APPLICATIONS

The present application is a National Phase of International Application Number PCT/JP2017/044236 filed Dec. 8, 2017 and claims priority to Japanese Application Number 2016-243708 filed Dec. 15, 2016.

TECHNICAL FIELD

The present invention relates to a transition duct, a turbine, and a gas turbine engine.

BACKGROUND ART

A technique related to a transition duct that forms a gas flow path for a mainstream gas, which is sent from a high-pressure turbine to a low-pressure turbine, is known in the related art. For example, a transition duct, which forms a flow path between a wall on a radially inner side and a wall on a radially outer side and in which the inclination of the wall on the radially outer side increases from an upstream end of the transition duct to a predetermined axial-direction position and decreases from the predetermined axial-direction position to a downstream end, is disclosed in PTL 1.

CITATION LIST

Patent Literature

[PTL 1] United States Patent No. 2014/0086739

SUMMARY OF INVENTION

Technical Problem

Since a low-pressure turbine has a larger diameter than a high-pressure turbine in general, an inner surface of a gas flow path of a transition duct extends while being inclined with respect to an axial direction such that a diameter thereof increases from a high-pressure turbine side toward a low-pressure turbine side. In addition, it is desirable to sufficiently increase the diameter of the gas flow path while making a duct length short in order to achieve efficiency improvement and weight reduction of the turbine. As a result, there is a possibility that an inclination angle of the inner surface of the gas flow path with respect to the axial direction becomes large and flow of a mainstream gas from the inner surface of the gas flow path becomes likely to cause delamination. Delamination by flow of a mainstream gas leads to an increase in pressure loss, thereby causing a decline in efficiency of the turbine in the end. The transition duct of PTL 1 achieves suppression of delamination by flow of a mainstream gas by the inclination of the wall on the radially outer side being increased up until the middle of the gas flow path and being decreased from the middle of the gas flow path. However, suppression of delamination by flow of a mainstream gas still has room for improvement.

The present invention is devised in view of such circumstances, and an object thereof is to achieve both of efficiency improvement and weight reduction of the turbine and to achieve further efficiency improvement of the turbine by better suppressing delamination by flow of a mainstream gas in the transition duct.

Solution to Problem

According to an aspect of the present invention, in order to solve the problems described above and achieve the object, there is provided a transition duct that forms an annular gas flow path through which a mainstream gas flowing from a first turbine to a second turbine passes. The gas flow path has an inner circumferential side flow path surface on a center side of a rotary shaft of the first turbine and the second turbine and an outer circumferential side flow path surface which is provided on an outer circumferential side of the inner circumferential side flow path surface so as to oppose the inner circumferential side flow path surface. The inner circumferential side flow path surface and the outer circumferential side flow path surface each have a changing inclination angle with respect to an axial direction of the rotary shaft and extend on an outer side of the rotary shaft in a radial direction from the first turbine toward the second turbine. An inner circumferential side maximum inclination portion where the inclination angle of the inner circumferential side flow path surface is maximum is provided within a range from a position aligned with an outer circumferential side maximum inclination portion where the inclination angle of the outer circumferential side flow path surface is maximum to a position, which has advanced to a second turbine side by a length of 20% of a duct length or less, in the axial direction.

In the transition duct of the present invention, the inner circumferential side maximum inclination portion is disposed within the range from the position aligned with the outer circumferential side maximum inclination portion to the position, which has advanced to the second turbine side by a length of 20% of the duct length or less, in the axial direction. Accordingly, since the inner circumferential side maximum inclination portion can form flow of a mainstream gas from the inner circumferential side toward the outer circumferential side near the outer circumferential side maximum inclination portion, it is possible to suppress delamination toward the inner circumferential side by the mainstream gas in the vicinity of the outer circumferential side maximum inclination portion. As a result, it is possible to further reduce a pressure loss caused in the gas flow path while making the inclination angles of the inner surfaces (the inner circumferential side flow path surface and the outer circumferential side flow path surface) of the gas flow path relatively large as a whole and realizing a sufficient increase in the diameter of the gas flow path and shortening of the duct length. Therefore, the transition duct of the present invention can achieve both of efficiency improvement and weight reduction of the turbine and can achieve further efficiency improvement of the turbine by better suppressing delamination by flow of a mainstream gas in the transition duct.

Preferably, the outer circumferential side maximum inclination portion is provided within a range from a position, which has advanced from a duct inlet to the second turbine side by a length of 50% of the duct length, to a position, which has advanced by a length of 70% of the duct length or less, in the axial direction.

Accordingly, since a change in the inclination angle of the outer circumferential side flow path surface until reaching the outer circumferential side maximum inclination portion can be made relatively gradual by providing the outer circumferential side maximum inclination portion on the second half side of the transition duct, it is possible to even better suppress delamination by flow of a mainstream gas from the outer circumferential side flow path surface.

Preferably, a ratio between a difference between a mean diameter of the gas flow path at a duct outlet and a mean diameter of the gas flow path at a duct inlet and the duct length is 1.5 or more and 1.6 or less. Accordingly, shortening of the duct length can be achieved while securing a diameter increase amount (the difference) of the gas flow path. In addition, even in a case where a sufficient increase in the diameter of the gas flow path and shortening of the duct length are achieved in such a manner, the transition duct of the present invention can better suppress delamination by flow of a mainstream gas.

Preferably, the inclination angle of the outer circumferential side maximum inclination portion is 35° or more and 45° or less. Accordingly, since the inclination angle of the outer circumferential side flow path surface can be made relatively small as a whole, it is possible to even better suppress delamination by flow of a mainstream gas from the outer circumferential side flow path surface.

Preferably, the inclination angle of the outer circumferential side maximum inclination portion is 35° or more and less than 40°. Accordingly, since the inclination angle of the outer circumferential side flow path surface can be made relatively small as a whole, it is possible to even better suppress delamination by flow of a mainstream gas from the outer circumferential side flow path surface.

Preferably, the inclination angle of the inner circumferential side flow path surface at a duct inlet and the inclination angle of the outer circumferential side flow path surface at the duct inlet is 0°. Accordingly, delamination by flow of a mainstream gas close to the duct inlet can be better suppressed.

According to another aspect of the present invention, in order to solve the problems described above and achieve the object, there is provided a turbine including a first turbine, a second turbine that is a lower pressure turbine than the first turbine, and the transition duct that forms the gas flow path through which the mainstream gas flowing from the first turbine to the second turbine passes.

According to still another aspect of the present invention, in order to solve the problems described above and achieve the object, there is provided a gas turbine engine including a compressor that compresses air, a combustor that sprays a fuel and mixes the sprayed fuel and the air compressed by the compressor to combust the mixture, and the turbine that is driven by the mainstream gas generated by combusting the fuel.

Advantageous Effects of Invention

The transition duct, the turbine, and the gas turbine engine according to the present invention have an effect of achieving both of efficiency improvement and weight reduction of the turbine and of achieving further efficiency improvement of the turbine by better suppressing delamination by flow of a mainstream gas in the transition duct.

DESCRIPTION OF EMBODIMENTS

Hereinafter, an embodiment of a transition duct, a turbine, and a gas turbine engine according to the present invention will be described in detail based on the drawings. The invention is not limited by the embodiment.

Figure 1:
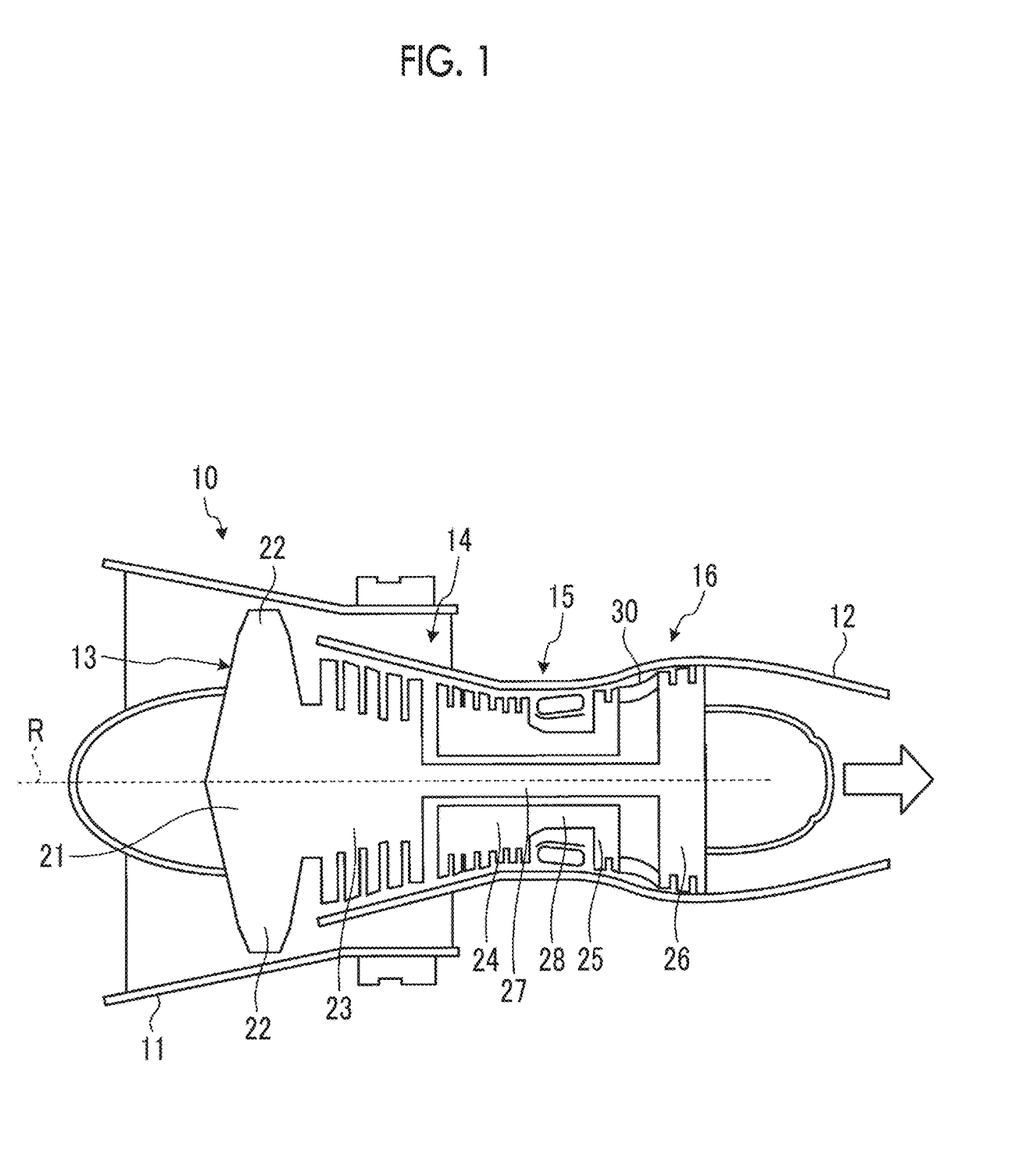
FIG. 1 is a schematic configuration view illustrating a transition duct, a turbine, and a gas turbine engine according to an embodiment of the present invention.

FIG. 1 is a schematic configuration view illustrating the transition duct, the turbine, and the gas turbine engine according to the embodiment of the present invention. A gas turbine engine 10 according to the embodiment is an aviation gas turbine engine (jet engine). As illustrated in FIG. 1, the gas turbine engine 10 has a fan casing 11 and an engine casing 12. The fan casing 11 accommodates a fan 13 inside. The engine casing 12 accommodates a compressor 14, a combustor 15, and a turbine 16 inside. The compressor 14, the combustor 15, and the turbine 16 are provided along an extending direction of an axis R of a rotary shaft 21.

The fan 13 is configured by a plurality of fan blades 22 being mounted on an outer circumferential portion of the rotary shaft 21. The rotary shaft 21 is supported so as to be rotatable about the axis R with respect to the fan casing 11 and the engine casing 12. The fan 13 rotates about the axis R along with the rotation of the rotary shaft 21, and sends air to the engine casing 12 along the axis R.

The compressor 14 has a low-pressure compressor 23 and a high-pressure compressor 24 which are disposed from an air flow upstream side to an air flow downstream side. The compressor 14 compresses air by means of the low-pressure compressor 23 and the high-pressure compressor 24. The combustor 15 is positioned on the air flow downstream side of the compressor 14, and is disposed along a circumferential direction around the rotary shaft 21. The combustor 15 sprays a fuel and mixes the sprayed fuel and the air compressed by the compressor 14 to combust the mixture.

The turbine 16 is positioned on the air flow downstream side of the combustor 15, and has a high-pressure turbine (first turbine) 25 and a low-pressure turbine (second turbine) 26. The low-pressure turbine 26 is disposed on the air flow downstream side of the high-pressure turbine 25. In the embodiment, the low-pressure turbine 26 has a larger diameter than the high-pressure turbine 25. A transition duct 30 that forms a gas flow path 40 (refer to FIG. 2), through which a mainstream gas (combustion gas) flowing from the high-pressure turbine 25 to the low-pressure turbine 26 passes, is disposed between the high-pressure turbine 25 and the low-pressure turbine 26. The rotary shaft 21 of the fan 13 and the low-pressure compressor 23 are connected to each other, and the low-pressure compressor 23 and the low-pressure turbine 26 are connected to each other by means of a first rotor shaft 27 that is coaxially disposed with the rotary shaft 21. In addition, on an outer circumferential side of the first rotor shaft 27, the high-pressure compressor 24 and the high-pressure turbine 25 are connected to each other by means of a second rotor shaft 28 that forms a cylindrical shape coaxially disposed with the rotary shaft 21. That is, the high-pressure turbine 25 and the low-pressure turbine 26 rotate about the axis R of the rotary shaft 21.

Therefore, air, which is sent by the fan 13 and is taken in the compressor 14, is compressed by passing a plurality of stator vanes and rotor blades of the low-pressure compressor 23 and the high-pressure compressor 24, thereby becoming a high-temperature and high-pressure compressed air. A fuel is supplied to the combustor 15 with respect to the compressed air, and a high-temperature and high-pressure combustion gas, which is a working fluid, is generated. The combustion gas generated in the combustor 15 passes a plurality of stator vanes and rotor blades of the high-pressure turbine 25 configuring the turbine 16 is sent to the low-pressure turbine 26 via the gas flow path 40 of the transition duct 30, and passes a plurality of stator vanes and rotor blades of the low-pressure turbine 26 to cause torque. Accordingly, the torque of the low-pressure turbine 26 is transmitted to the low-pressure compressor 23 by the first rotor shaft 27, thereby driving the low-pressure compressor. In addition, the torque of the high-pressure turbine 25 is transmitted to the high-pressure compressor 24 by the second rotor shaft 28, thereby driving the high-pressure compressor. In addition, the torque of the low-pressure compressor 23 is transmitted to the fan 13 by the rotary shaft 21, thereby driving the fan. As a result, it is possible to obtain thrust by an exhaust gas emitted from the turbine 16.

Figure 2:
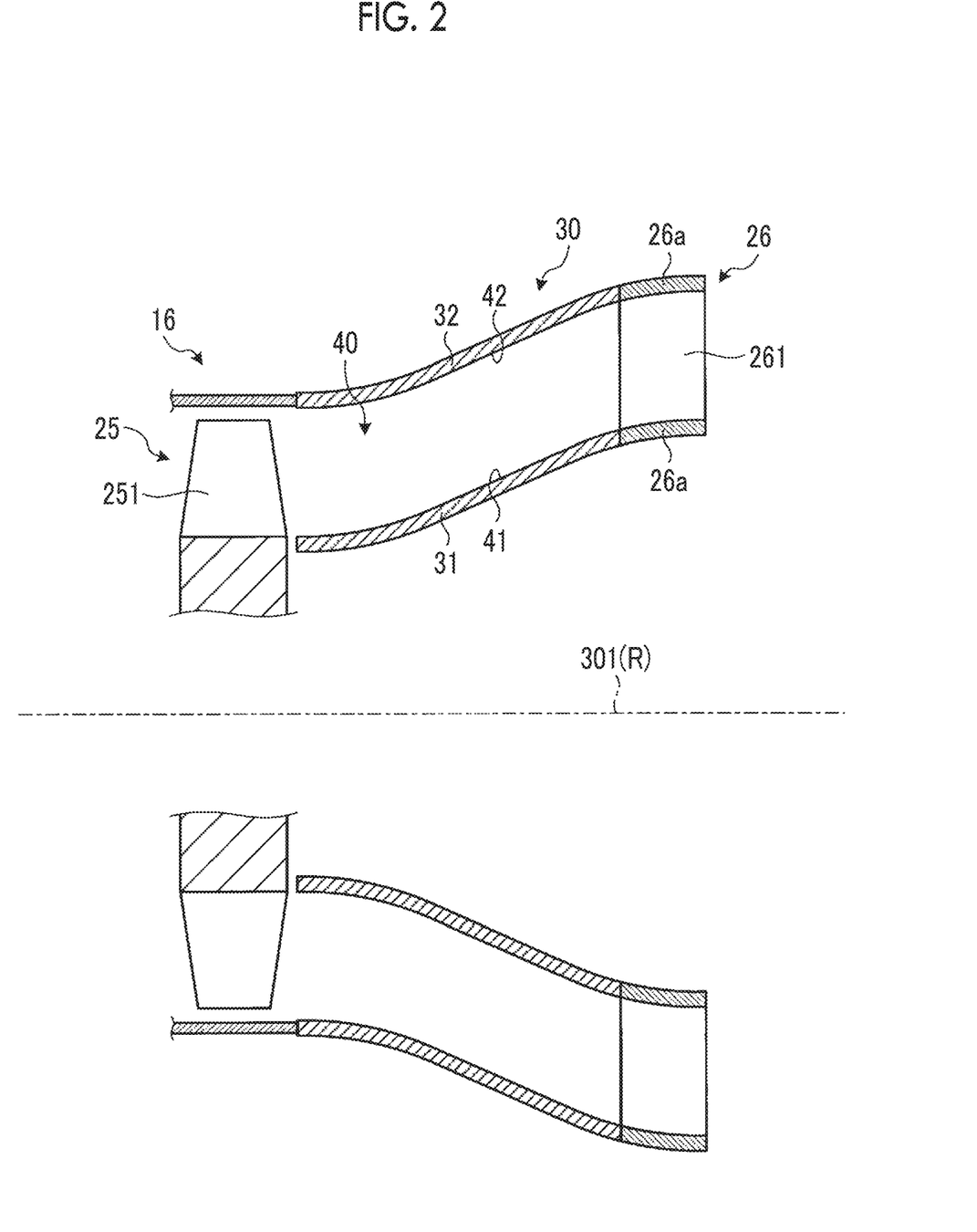
FIG. 2 is a sectional view illustrating the transition duct according to the embodiment.

Next, the transition duct according to the embodiment of the present invention will be described. FIG. 2 is a sectional view illustrating the transition duct according to the embodiment.

The transition duct 30 includes an inner cylindrical member 31 and an outer cylindrical member 32. The inner cylindrical member 31 is a cylindrical member. The inner cylindrical member 31 is coaxially disposed with the axis R of the rotary shaft 21 of the high-pressure turbine 25 and the low-pressure turbine 26. The inner cylindrical member 31 is provided immediately behind a rotor blade 251, which is a final stage of the high-pressure turbine 25. In addition, the inner cylindrical member 31 is provided immediately ahead of a stator vane 261, which is a first stage of the low-pressure turbine 26, and is connected to a shroud 26a that supports the stator vane 261. The outer cylindrical member 32 is a cylindrical member that is coaxially disposed on an outer side of the inner cylindrical member 31 with the inner cylindrical member 31 (coaxially with the axis R of the rotary shaft 21). The outer cylindrical member 32 is connected to the inner cylindrical member 31 via a connecting member (not illustrated). The outer cylindrical member 32 is provided immediately behind the rotor blade 251 of the high-pressure turbine 25. In addition, the outer cylindrical member 32 is provided immediately ahead of the stator vane 261, which is the first stage of the low-pressure turbine 26, and is connected to the shroud 26a that supports the stator vane 261.

The gas flow path 40 of the transition duct 30 has an inner circumferential side flow path surface 41 on a center (the axis R) side of the rotary shaft 21, which is the rotary shaft of the high-pressure turbine 25 and the low-pressure turbine 26, and an outer circumferential side flow path surface 42 which is provided on an outer circumferential side of the inner circumferential side flow path surface 41 so as to oppose the inner circumferential side flow path surface 41. The inner circumferential side flow path surface 41 is formed by an outer circumferential surface of the inner cylindrical member 31. In addition, the outer circumferential side flow path surface 42 is formed by an inner circumferential surface of the outer cylindrical member 32. That is, the gas flow path 40 is formed by the inner cylindrical member 31 and the outer cylindrical member 32 which are coaxially disposed with the axis R of the rotary shaft 21.

Hereinafter, an axial direction of the rotary shaft 21 will be referred to as the "axial direction", and a radial direction of the rotary shaft 21 will be referred to as the "radial direction".

Figure 3:
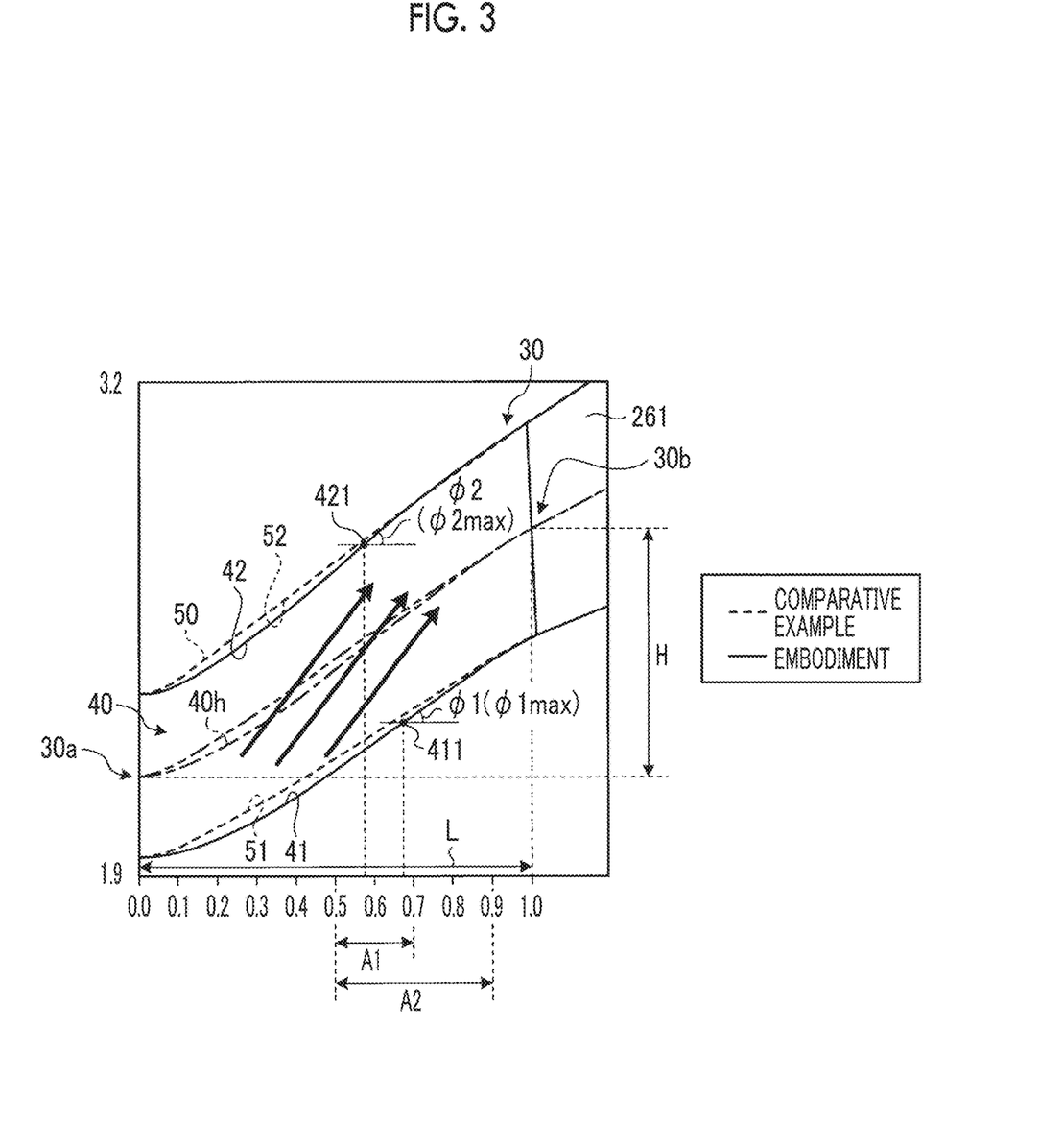
FIG. 3 is an explanatory diagram showing a profile of an inner circumferential side flow path surface and an outer circumferential side flow path surface of the transition duct according to the embodiment.

FIG. 3 is an explanatory diagram showing a profile of the inner circumferential side flow path surface and the outer circumferential side flow path surface of the transition duct according to the embodiment. The horizontal axis of FIG. 3 represents an axial-direction distance from a duct inlet 30a of the transition duct 30, and the vertical axis represents a radial direction distance from a center 301 (the axis R of the rotary shaft 21. Refer to FIG. 2) of the transition duct 30. The horizontal axis and the vertical axis of FIG. 3 are made dimensionless by being divided by a duct length L of the transition duct 30. In the following description, an axial-direction position which has advanced by α % of the duct length L from the duct inlet 30a will be described as X=α/100. That is, in the following description, the duct inlet 30a of the transition duct 30 is at a position of X=0.0, and a duct outlet 30b of the transition duct 30 is at a position of X=1.0. In addition, FIG. 3 shows a profile of a transition duct 50 as a comparative example.

Figure 4:
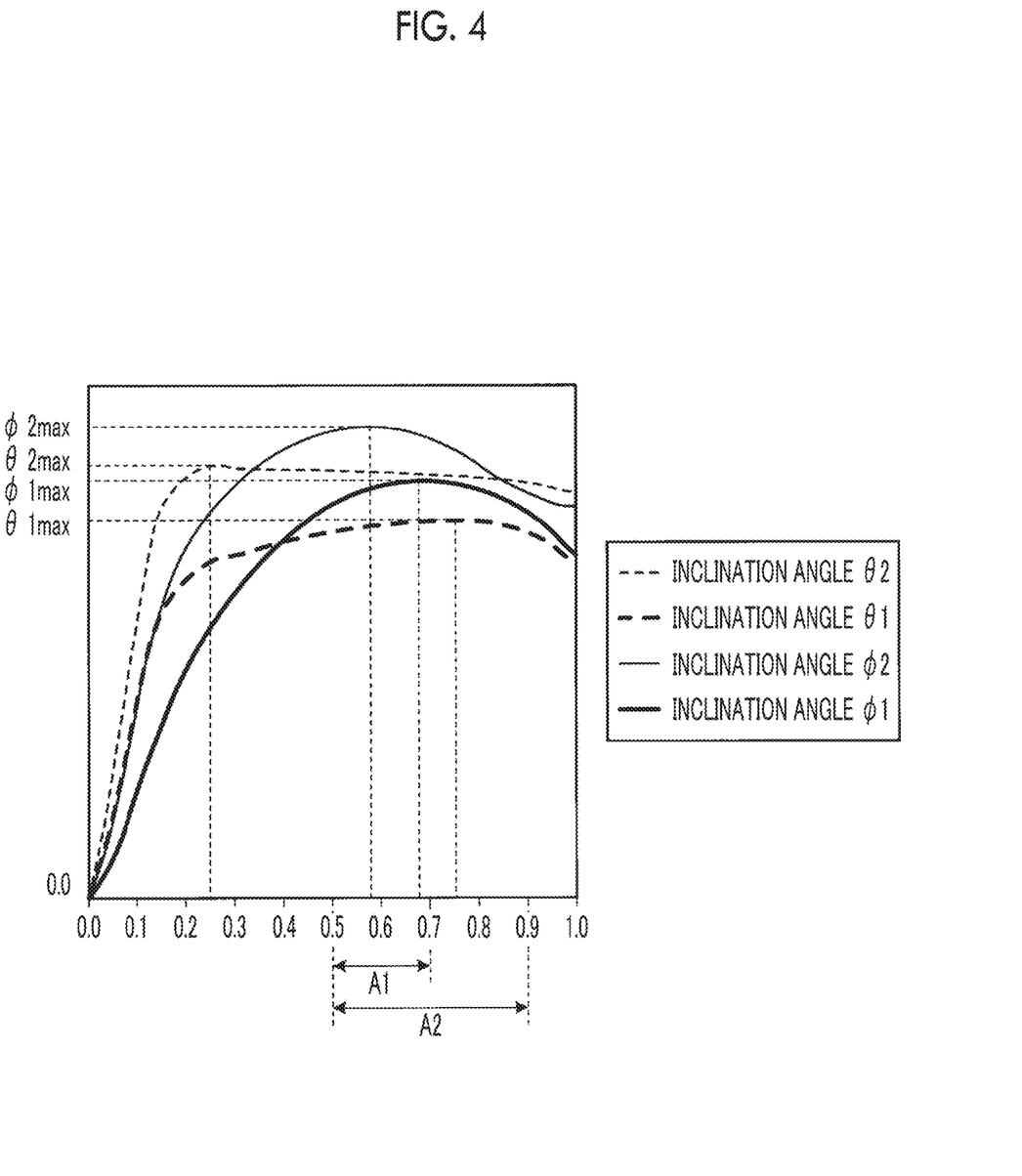
FIG. 4 is an explanatory diagram showing a change in an inclination angle of the inner circumferential side flow path surface of the transition duct with respect to an axial direction and a change in an inclination angle of the outer circumferential side flow path surface with respect to the axial direction of the transition duct according to the embodiment.

FIG. 4 is an explanatory diagram showing a change in an inclination angle of the inner circumferential side flow path surface of the transition duct with respect to the axial direction and a change in an inclination angle of the outer circumferential side flow path surface with respect to the axial direction of the transition duct according to the embodiment. The horizontal axis of FIG. 4 represents the axial-direction distance from the duct inlet 30a of the transition duct 30, and the vertical axis represents a value of an inclination angle φ1 of the inner circumferential side flow path surface 41 and a value of the inclination angle φ2 of the outer circumferential side flow path surface 42. The horizontal axis of FIG. 4 is also dimensionless by being divided by the duct length L of the transition duct 30. FIG. 4 shows a value of an inclination angle θ1 of an inner circumferential side flow path surface 51 of the transition duct 50, which is the comparative example, with respect to the axial direction and a value of an inclination angle θ2 of an outer circumferential side flow path surface 52 of the transition duct with respect to the axial direction.

Herein, the duct inlet 30a is an opening end of the transition duct 30 on a high-pressure turbine 25 side. In addition, the duct outlet 30b is an opening end of the transition duct 30 on a low-pressure turbine 26 side. In the embodiment, the duct outlet 30b is at a position where the stator vane 261 of the low-pressure turbine 26 and a line (one-dot chain line in FIG. 3) connected to a position corresponding to a mean diameter 40h of the gas flow path 40 intersect each other. The mean diameter 40h of the gas flow path 40 is a radial direction distance from the center 301 of the transition duct 30 (refer to FIG. 2) to a center of the gas flow path 40 (middle position between the inner circumferential side flow path surface 41 and the outer circumferential side flow path surface 42). In addition, the duct length L of the transition duct 30 is an axial-direction distance from the duct inlet 30a to the duct outlet 30b.

As shown in FIG. 3, the inner circumferential side flow path surface 41 of the gas flow path 40 has the changing inclination angle ϕ1 with respect to the axial direction, and extends on an outer side in the radial direction from the high-pressure turbine 25 toward the low-pressure turbine 26. Similarly, also the outer circumferential side flow path surface 42 of the gas flow path 40 has the changing inclination angle ϕ2 with respect to the axial direction, and extends on the outer side in the radial direction from the high-pressure turbine 25 toward the low-pressure turbine 26. That is, the diameter of the gas flow path 40 (the transition duct 30) increases (the mean diameter 40h increases) from the high-pressure turbine 25 side toward the low-pressure turbine 26 side. A ratio between a difference H between the mean diameter 40h of the gas flow path 40 at the duct outlet 30b and the mean diameter 40h of the gas flow path 40 at the duct inlet 30a (diameter increase amount of the gas flow path 40) and the duct length L of the transition duct 30 is 1.5 or more and 1.6 or less. The same also applies to the transition duct 50, which is the comparative example.

In the transition duct 30 according to the embodiment, an outer circumferential side maximum inclination portion 421 where the inclination angle ϕ2 of the outer circumferential side flow path surface 42 is maximum is provided within a range A1 from a position which has advanced to the low-pressure turbine 26 side by a length of 50% of the duct length L from the duct inlet 30a to a position which has advanced by a length of 70% of the duct length or less in the axial direction. The range A1 is a range of X=0.5 to X=0.7 on the horizontal axes of FIGS. 3 and 4. It is more preferable to provide the outer circumferential side maximum inclination portion 421 at a position of X=0.6. In addition, in the transition duct 30 according to the embodiment, a maximum inclination angle ϕ2max, which is the inclination angle ϕ2 of the outer circumferential side maximum inclination portion 421, is 35° or more and 45° or less.

In addition, in the transition duct 30 according to the embodiment, an inner circumferential side maximum inclination portion 411 where the inclination angle ϕ1 of the inner circumferential side flow path surface 41 is maximum is provided within a range A2 from a position aligned with the outer circumferential side maximum inclination portion 421 to a position, which has advanced to the low-pressure turbine 26 side by a length of 20% of the duct length L or less, in the axial direction. In the embodiment, in a case where the outer circumferential side maximum inclination portion 421 is positioned at X=0.5, the range A2 is a range of X=0.5 to X=0.7. In a case where the outer circumferential side maximum inclination portion 421 is positioned at X=0.7, the range A2 is a range of X=0.7 to X=0.9. It is more preferable to provide the inner circumferential side maximum inclination portion 411 at a position, which has advanced to the low-pressure turbine 26 side by a length of 10% of the duct length L, from the position aligned with the outer circumferential side maximum inclination portion 421 in the axial direction. In addition, in the transition duct according to the embodiment, a maximum inclination angle ϕ1max, which is the inclination angle ϕ1 of the inner circumferential side maximum inclination portion 411, is set to an angle smaller than the maximum inclination angle ϕ2max, which is the inclination angle ϕ2 of the outer circumferential side maximum inclination portion 421 (for example, 30° or more and 40° or less).

In addition, as shown in FIGS. 3 and 4, in the transition duct 30 according to the embodiment, the inclination angle ϕ1 of the inner circumferential side flow path surface 41 at the duct inlet 30a and the inclination angle ϕ2 of the outer circumferential side flow path surface 42 at the duct inlet 30a are 0°. That is, the inner circumferential side flow path surface 41 and the outer circumferential side flow path surface 42 extend in parallel with the axial direction near the duct inlet 30a.

On the other hand, as shown in FIG. 4, a maximum inclination angle θ1max of the inner circumferential side flow path surface 51 of the transition duct 50, which is the comparative example, is provided at a position of X=0.75. The maximum inclination angle θ1max is smaller than the maximum inclination angle θ1max of the inner circumferential side flow path surface 41 of the transition duct 30. In addition, a maximum inclination angle θ2max of the outer circumferential side flow path surface 52 of the transition duct 50, which is the comparative example, is provided at a position of X=0.25. The maximum inclination angle θ2max is smaller than the maximum inclination angle ϕ2max of the outer circumferential side flow path surface 42 of the transition duct 30.

Figure 5:
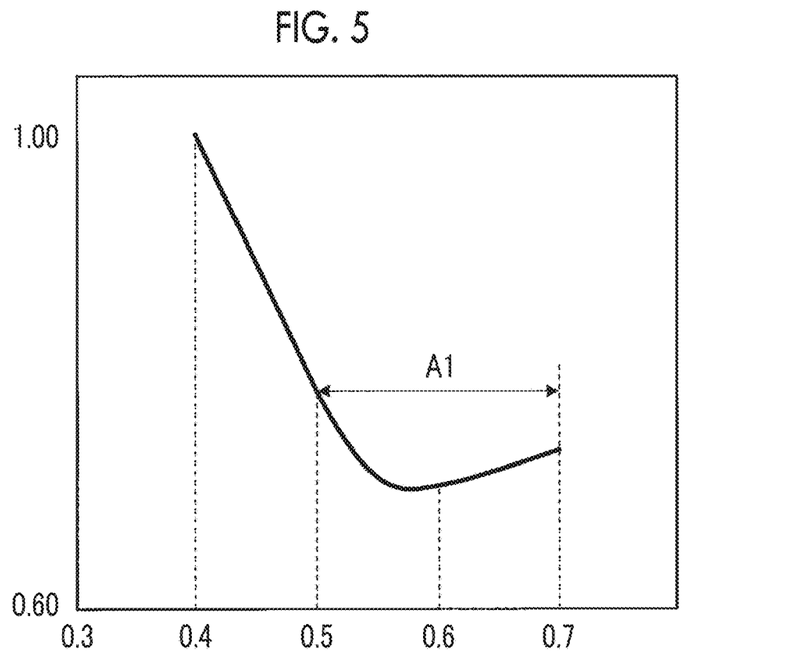
FIG. 5 is an analysis result showing a size of a region of delamination by flow of a mainstream gas generated in a gas flow path when positions of an inner circumferential side maximum inclination portion and an outer circumferential side maximum inclination portion are changed within a range of X=0.4 to X=0.7.

Next, suppression of delamination by flow of a mainstream gas in the gas flow path 40 of the transition duct 30 according to the embodiment will be described based on the drawings. FIG. 5 is an analysis result showing the size of a region of delamination by flow of a mainstream gas generated in the gas flow path when the axial-direction positions of the inner circumferential side maximum inclination portion and the outer circumferential side maximum inclination portion are changed within a range of X=0.4 to X=0.7. In the analysis result of FIG. 5, the inner circumferential side maximum inclination portion 411 and the outer circumferential side maximum inclination portion 421 are at the same axial-direction position. The horizontal axis of FIG. 5 represents the axial-direction positions of the inner circumferential side maximum inclination portion 411 and the outer circumferential side maximum inclination portion 421. The horizontal axis of FIG. 5 is made dimensionless by being divided by the duct length L of the transition duct 30. The vertical axis of FIG. 5 represents the size of a region of delamination. The "size of a region of delamination" is a radial direction distance from a position where a total pressure of flow of a mainstream gas on an outer circumferential side flow path surface 42 side of the mean diameter 40h is maximum to the outer circumferential side flow path surface 42 in the gas flow path 40. However, a value on the vertical axis of FIG. 5 is made dimensionless by setting the size of a region of delamination to 1.0 in a case where the axial-direction position of the outer circumferential side maximum inclination portion 421 and the axial-direction position of the inner circumferential side maximum inclination portion 411 are set to X=0.4.

As shown in FIG. 5, as the axial-direction positions of the inner circumferential side maximum inclination portion 411 and the outer circumferential side maximum inclination portion 421 change from X=0.4 to the low-pressure turbine 26 side (the right in FIG. 5), the size of a region of delamination gradually decreases. The size of a region of delamination is minimum near an area where the axial-direction positions of the inner circumferential side maximum inclination portion 411 and the outer circumferential side maximum inclination portion 421 are X=0.6. After then, as the axial-direction positions of the inner circumferential side maximum inclination portion 411 and the outer circumferential side maximum inclination portion 421 near the low-pressure turbine 26 side, the size of a region of delamination gradually increases. Accordingly, it is clear that the size of a region of delamination can be made relatively small within the range A1 where the axial-direction positions of the inner circumferential side maximum inclination portion 411 and the outer circumferential side maximum inclination portion 421 are X=0.5 to X=0.7. That is, a change in the inclination angle ϕ2 of the outer circumferential side flow path surface 42 until reaching the outer circumferential side maximum inclination portion 421 can be made relatively gradual by providing the outer circumferential side maximum inclination portion 421 on a second half side (the range A1 of X=0.5 to X=0.7) of the transition duct 30. As a result, it is possible to suppress delamination by flow of a mainstream gas from the outer circumferential side flow path surface 42.

Figure 6:
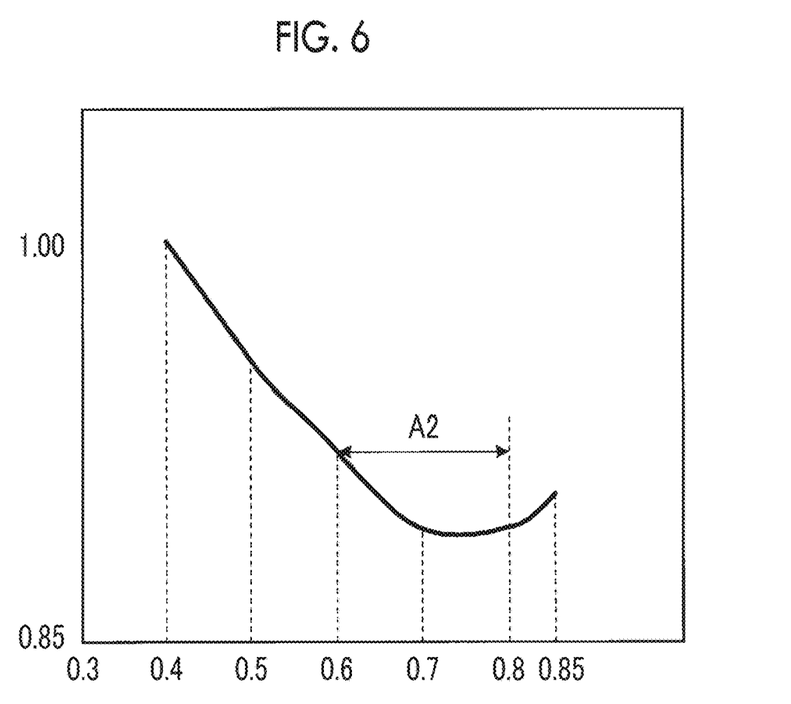
FIG. 6 is an analysis result showing a change in the size of the region of delamination when the position of the outer circumferential side maximum inclination portion is fixed at X=0.6 and the position of the inner circumferential side maximum inclination portion is changed from X=0.4 to X=0.85.

Next, FIG. 6 is an analysis result showing a change in the size of a region of delamination when the axial-direction position of the outer circumferential side maximum inclination portion is set to X=0.6 and the axial-direction position of the inner circumferential side maximum inclination portion is changed from X=0.4 to X=0.85. The horizontal axis of FIG. 6 represents the axial-direction position of the inner circumferential side maximum inclination portion 411. The horizontal axis of FIG. 6 is made dimensionless by being divided by the duct length L of the transition duct 30. The vertical axis of FIG. 6 represents the size of a region of delamination. However, a value on the vertical axis of FIG. 6 is made dimensionless by setting the size of a region of delamination to 1.0 in a case where the position of the inner circumferential side maximum inclination portion 411 is set to X=0.4.

As shown in FIG. 6, as the axial-direction position of the inner circumferential side maximum inclination portion 411 changes from X=0.4 to the low-pressure turbine 26 side, the size of a region of delamination gradually decreases. The size of a region of delamination is minimum near an area where the axial-direction position of the inner circumferential side maximum inclination portion 411 is X=0.7. That is, the size of a region of delamination is minimum near a position, which has advanced to the low-pressure turbine 26 side by a length of 10% of the duct length L (herein, X=0.7) from the position where the inner circumferential side maximum inclination portion 411 is aligned with the outer circumferential side maximum inclination portion 421 in the axial direction (herein, X=0.6). After then, the size of a region of delamination gradually increases as the axial-direction position of the inner circumferential side maximum inclination portion 411 nears the low-pressure turbine 26 side. Accordingly, it is clear that the size of a region of delamination can be made relatively small if the inner circumferential side maximum inclination portion 411 is disposed within the range A2 (herein, a range of X=0.6 to X=0.8) from a position aligned with the outer circumferential side maximum inclination portion 421 to the position which has advanced to the low-pressure turbine 26 side by a length of 20% of the duct length L or less in the axial direction. That is, by disposing the inner circumferential side maximum inclination portion 411 within the range A2, the inner circumferential side maximum inclination portion 411 can form flow of a mainstream gas from an inner circumferential side toward the outer circumferential side near the outer circumferential side maximum inclination portion 421 as shown with solid arrows in FIG. 3. As a result, it is possible to suppress delamination toward the inner circumferential side by the mainstream gas in the vicinity of the outer circumferential side maximum inclination portion 421.

Figure 7:
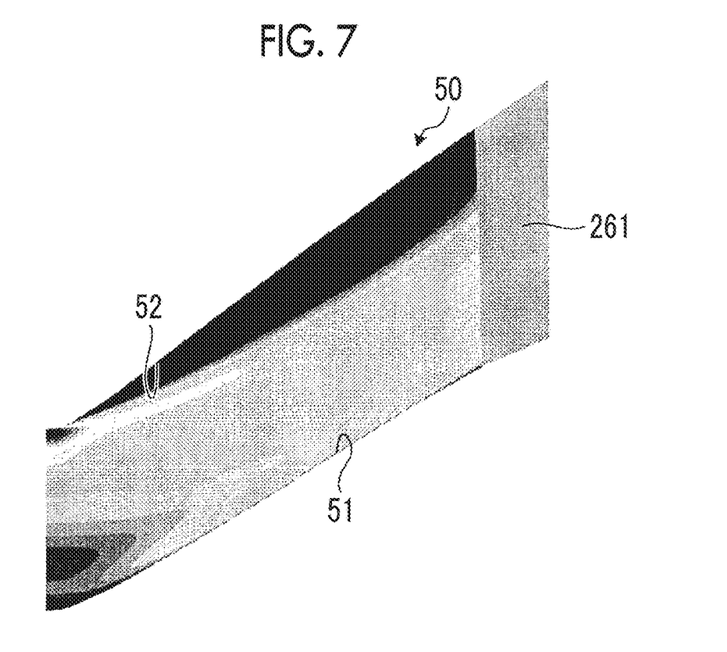
FIG. 7 is an analysis result showing Mach number distribution of flow of a mainstream gas in a transition duct, which is a comparative example.
Figure 8:
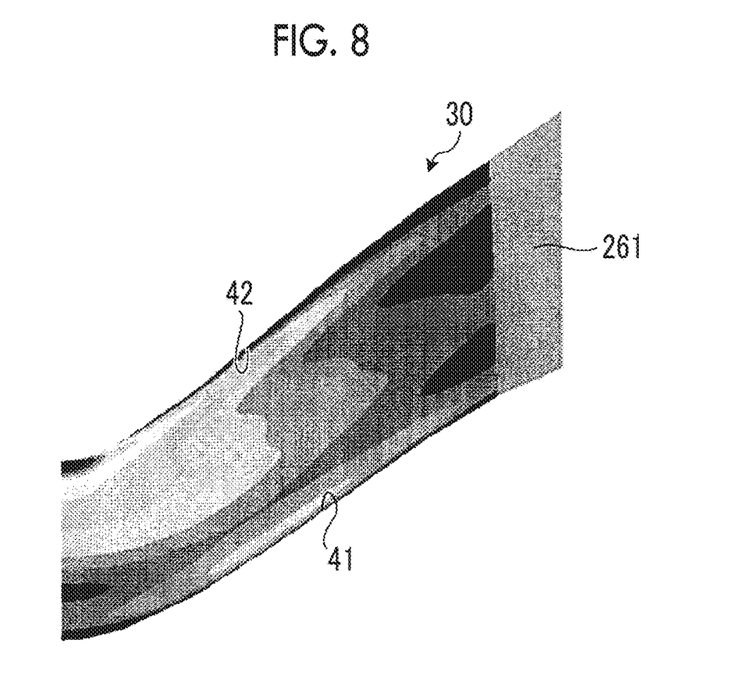
FIG. 8 is an analysis result showing Mach number distribution of flow of the mainstream gas in the transition duct according to the embodiment.

FIG. 7 is an analysis result showing Mach number distribution of flow of a mainstream gas in the transition duct, which is the comparative example, and FIG. 8 is an analysis result showing Mach number distribution of flow of a mainstream gas in the transition duct according to the embodiment. In FIGS. 7 and 8, a portion with a deeper color has a lower Mach number. As illustrated in FIG. 7, it is clear that the value of the Mach number of a mainstream gas near the outer circumferential side flow path surface 52 becomes low as flow of a mainstream gas is directed from the high-pressure turbine 25 side toward the low-pressure turbine 26 side, in the transition duct 50 of the comparative example. That is because a region of delamination where a mainstream gas delaminates the outer circumferential side flow path surface 52 becomes large from near the outer circumferential side maximum inclination portion toward the low-pressure turbine 26 side. On the other hand, it is clear that the transition duct 30 according to the embodiment can better suppress a decline in the Mach number near the outer circumferential side flow path surface 42 compared to the transition duct 50 of the comparative example, as illustrated in FIG. 8. As described above, the transition duct 30 according to the embodiment can better suppress delamination of the outer circumferential side flow path surface 42 by flow of a mainstream gas compared to the transition duct 50 of the comparative example.

As described hereinbefore, in the transition duct 30 according to the embodiment, the inner circumferential side maximum inclination portion 411 is disposed within the range A2 from the position aligned with the outer circumferential side maximum inclination portion 421 to the position, which has advanced to the low-pressure turbine 26 side by a length of 20% or less of the duct length L, in the axial direction. Accordingly, since the inner circumferential side maximum inclination portion 411 can form flow of a mainstream gas from the inner circumferential side toward the outer circumferential side near the outer circumferential side maximum inclination portion 421, it is possible to suppress delamination toward the inner circumferential side by a mainstream gas in the vicinity of the outer circumferential side maximum inclination portion 421. As a result, it is possible to further reduce a pressure loss caused in the gas flow path 40 while making the inclination angles ϕ1 and ϕ2 of the inner surfaces (the inner circumferential side flow path surface 41 and the outer circumferential side flow path surface 42) of the gas flow path 40 relatively large as a whole and realizing a sufficient increase in the diameter of the gas flow path 40 and shortening of the duct length L. Therefore, the transition duct 30, the turbine 16, and the gas turbine engine 10 according to the embodiment can achieve both of efficiency improvement and weight reduction of the turbine 16 and can achieve further efficiency improvement of the turbine 16 by better suppressing delamination by flow of a mainstream gas in the transition duct 30.

In addition, the outer circumferential side maximum inclination portion 421 is provided within the range A1 from the position which has advanced to the low-pressure turbine 26 side by a length of 50% of the duct length L from the duct inlet 30a to the position which has advanced by a length of 70% of the duct length or less in the axial direction. Accordingly, since a change in the inclination angle ϕ2 of the outer circumferential side flow path surface 42 until reaching the outer circumferential side maximum inclination portion 421 can be made relatively gradual by providing the outer circumferential side maximum inclination portion 421 on the second half side of the transition duct 30, it is possible to even better suppress delamination by flow of a mainstream gas from the outer circumferential side flow path surface 42. The outer circumferential side maximum inclination portion 421 may be provided outside the range A2.

In addition, a ratio between the difference H between the mean diameter 40h of the gas flow path 40 at the duct outlet 30b and the mean diameter 40h of the gas flow path 40 at the duct inlet 30a and the duct length L is 1.5 or more and 1.6 or less. Accordingly, shortening of the duct length L can be achieved while securing a diameter increase amount (the difference H) of the gas flow path 40. In addition, even in a case where a sufficient increase in the diameter of the gas flow path 40 and shortening of the duct length L are achieved in such a manner, the transition duct 30 according to the embodiment can better suppress delamination by flow of a mainstream gas. A ratio between the difference H and the duct length L is not limited to 1.5 or more and 1.6 or less.

In addition, the inclination angle φ2 of the outer circumferential side maximum inclination portion 421 (the maximum inclination angle φ2max) is 35° or more and 45° or less. Accordingly, since the inclination angle φ2 of the outer circumferential side flow path surface 42 can be made relatively small as a whole, it is possible to even better suppress delamination by flow of a mainstream gas from the outer circumferential side flow path surface 42. The maximum inclination angle φ2max is not limited to 35° or more and 45° or less.

In addition, the inclination angle φ2 of the outer circumferential side maximum inclination portion 421 (the maximum inclination angle φ2max) may be 35° or more and less than 40°. Accordingly, since the inclination angle φ2 of the outer circumferential side flow path surface 42 can be made relatively small as a whole, it is possible to even better suppress delamination by flow of a mainstream gas from the outer circumferential side flow path surface 42.

In addition, the inclination angle φ1 of the inner circumferential side flow path surface 41 at the duct inlet 30a and the inclination angle φ2 of the outer circumferential side flow path surface 42 at the duct inlet 30a are 0°. Accordingly, delamination by flow of a mainstream gas close to the duct inlet 30a can be better suppressed. The inclination angle φ1 and the inclination angle φ2 at the duct inlet 30a may be larger than 0°.

Although the transition duct and the turbine of the present invention are applied to the gas turbine engine 10 in the embodiment, the present invention may be applied to a steam turbine engine.

REFERENCE SIGNS LIST

10: gas turbine engine
11: fan casing
12: engine casing
13: fan
14: compressor
15: combustor
16: turbine
21: rotary shaft
22: fan blade
23: low-pressure compressor
24: high-pressure compressor
25: high-pressure turbine
251: rotor blade
26: low-pressure turbine
26a: shroud
261: stator vane
27: first rotor shaft
28: second rotor shaft
30, 50: transition duct
30a: duct inlet
30b: duct outlet
301: center
31: inner cylindrical member
32: outer cylindrical member
40: gas flow path
40h: mean diameter
41, 51: inner circumferential side flow path surface
411: inner circumferential side maximum inclination portion
42, 52: outer circumferential side flow path surface
421: outer circumferential side maximum inclination portion
L: duct length
R: axis
θ1, θ2, φ1, φ2: inclination angle
φ1max, φ2max, θ1max, θ2max: maximum inclination angle

The invention claimed is:

1. A transition duct that forms an annular gas flow path through which a mainstream gas flowing from a first turbine to a second turbine passes,
wherein the gas flow path has an inner circumferential side flow path surface on a center side of a rotary shaft of the first turbine and the second turbine and an outer circumferential side flow path surface which is provided on an outer circumferential side of the inner circumferential side flow path surface so as to oppose the inner circumferential side flow path surface,
the inner circumferential side flow path surface and the outer circumferential side flow path surface each have a changing inclination angle with respect to an axial direction of the rotary shaft and extend on an outer side of the rotary shaft in a radial direction from the first turbine toward the second turbine, and
an inner circumferential side maximum inclination portion where the inclination angle of the inner circumferential side flow path surface is maximum in the axial length of the transition duct is provided within a range from a first position aligned with an outer circumferential side maximum inclination portion where the inclination angle of the outer circumferential side flow path surface is maximum in the axial length of the transition duct to a second position, which is located in a range of 0% or more and 20% or less of a length of a duct from a second turbine side, in the axial direction.

2. The transition duct according to claim 1,
wherein the outer circumferential side maximum inclination portion is provided within a range from a third position, which has advanced from a duct inlet to the second turbine side by a length of 50% of the duct length, to a fourth position, which has advanced by a length of 70% of the duct length or less, in the axial direction.

3. The transition duct according to claim 1,
wherein a ratio between a difference between a mean diameter of the gas flow path at a duct outlet and a mean diameter of the gas flow path at a duct inlet and the duct length is 1.5 or more and 1.6 or less.

4. The transition duct according to claim 1,
wherein the inclination angle of the outer circumferential side maximum inclination portion is 35° or more and 45° or less.
5. The transition duct according to claim 1,
wherein the inclination angle of the outer circumferential side maximum inclination portion is 35° or more and less than 40°.
6. The transition duct according to claim 1,
wherein the inclination angle of the inner circumferential side flow path surface at a duct inlet and the inclination angle of the outer circumferential side flow path surface at the duct inlet are 0°.
7. A turbine comprising:
a first turbine;
a second turbine that is a lower pressure turbine than the first turbine; and
the transition duct according to claim 1 that forms the gas flow path through which the mainstream gas flowing from the first turbine to the second turbine passes.
8. A gas turbine engine comprising:
a compressor that compresses air;
a combustor that sprays a fuel and mixes the sprayed fuel and the air compressed by the compressor to combust the mixture; and
the turbine according to claim 7 that is driven by the mainstream gas generated by combusting the fuel.

\* \* \* \* \*